Aug. 10, 1926.
G. S. BARROWS
VALVE
Filed Feb. 13, 1926   2 Sheets-Sheet 1
1,595,959
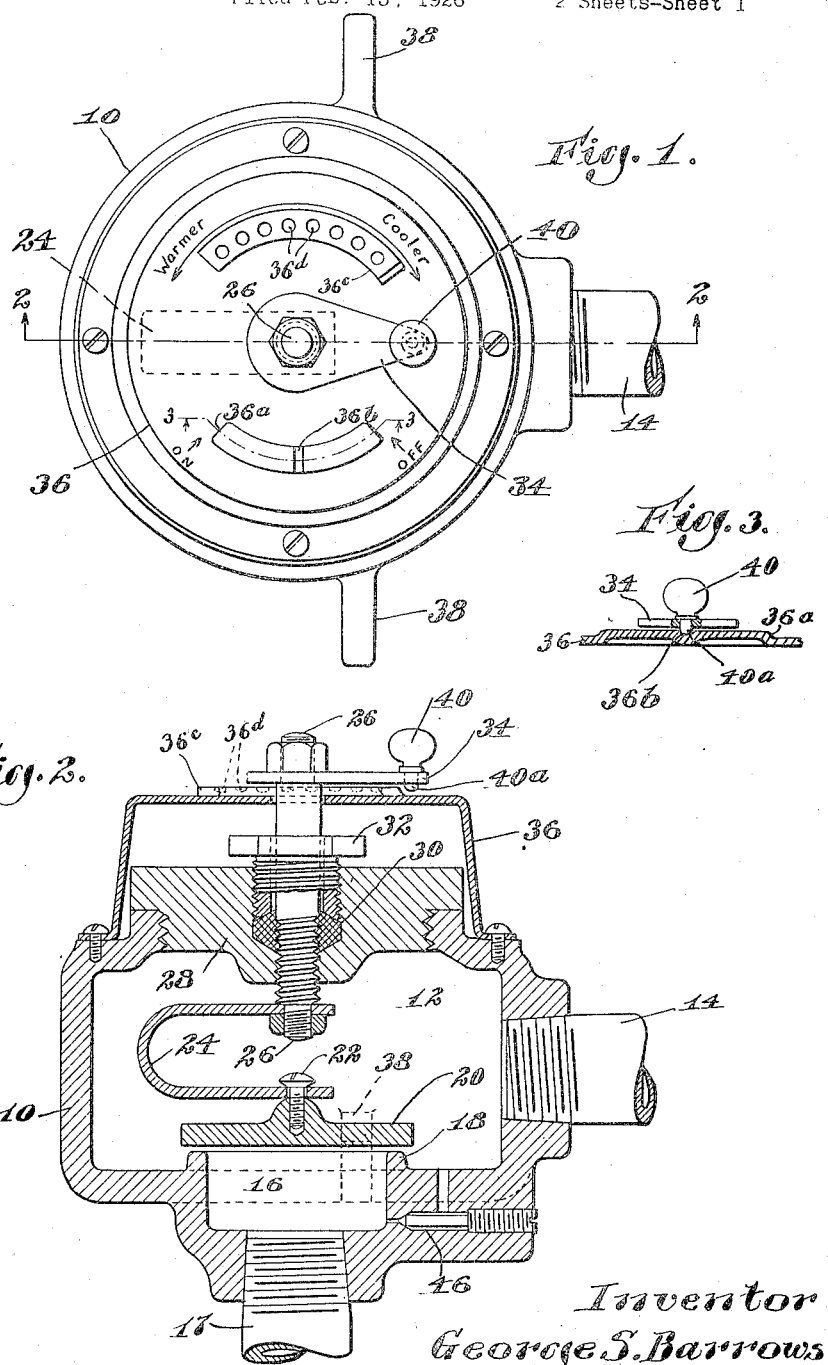
Inventor
George S. Barrows
By Mitchell, Chadwick & Kent
Attorneys

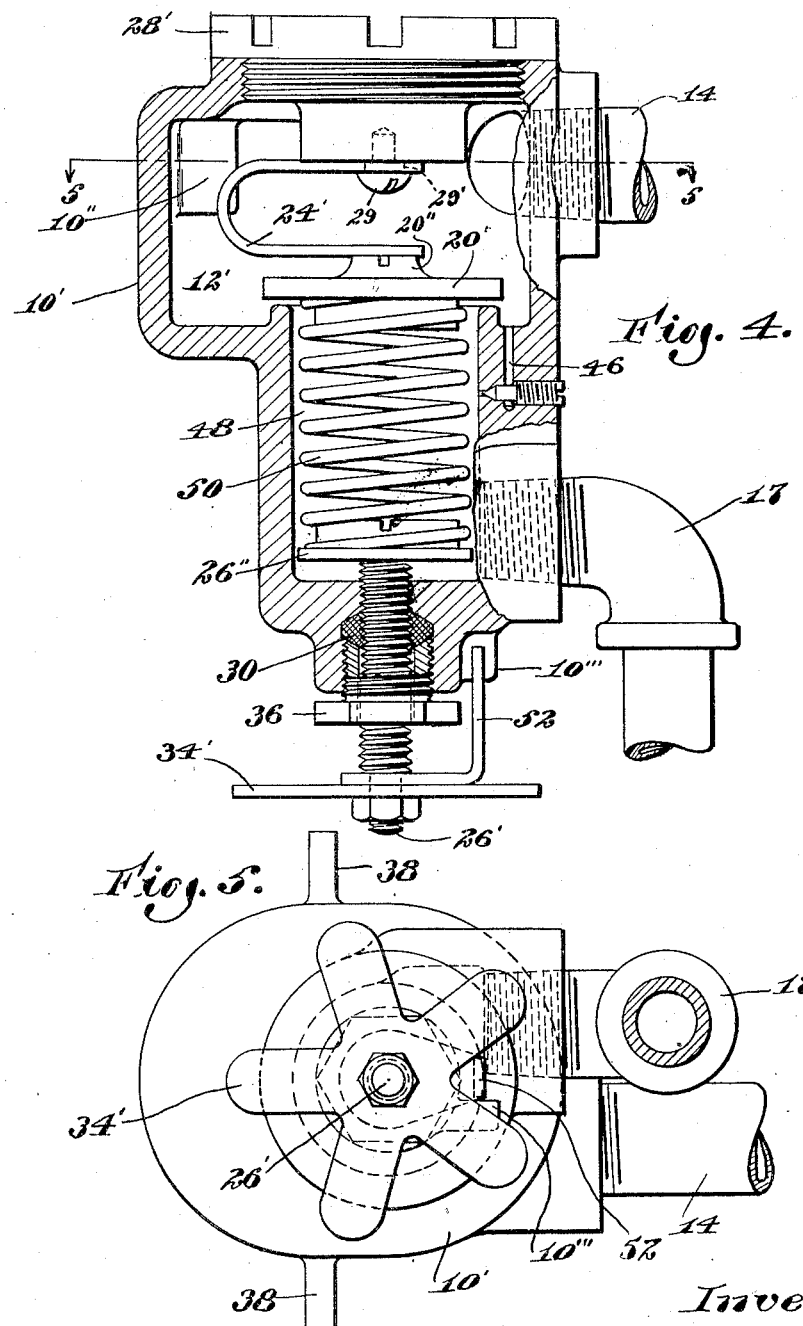

Patented Aug. 10, 1926.

1,595,959

UNITED STATES PATENT OFFICE.

GEORGE S. BARROWS, OF PROVIDENCE, RHODE ISLAND, ASSIGNOR TO GENERAL FIRE EXTINGUISHER COMPANY, OF PROVIDENCE, RHODE ISLAND, A CORPORATION OF DELAWARE.

VALVE.

Application filed February 13, 1926. Serial No. 88,153.

This invention relates to improvements in valves. More especially it relates to a combined shut off and thermostatic control valve for apparatus controlling the flow of fluid. The invention is herein particularly described and shown in a form which is suitable for application to a gas radiator, where it controls flow of fuel to a burner whose heat affects a thermo-responsive control element of the valve; but this is merely illustrative of one use to which it may be put.

It is an object of the invention to provide inexpensive control apparatus of simple, compact and rugged construction which can be adjusted with ease and which will act with certainty to effect the nicety of control desired. It is also an object to provide apparatus which can be set manually to maintain the valve closed or open irrespective of the subsequent action of the thermo-responsive parts. It is a feature that the forces concerned and the parts moved act all in alignment along a single axis, and that one of these interconnected parts is of a resilient character which permits its yielding as the valve is seated. It is also a feature that this yieldable member is the thermostatic element and that this element is so shaped and disposed that it may continue to respond to rise of temperature after it has effected a seating of the valve without harm or damaging strain.

These objects and the features which characterize the structure herein disclosed are attained by providing a casing which may be generally cylindrical, having a valve seat within concentric with its axis. The valve proper is a simple flat disk and is attached to one leg of a U-shaped thermostatic bar spring. In the preferred form of the invention the other leg of this thermo-responsive spring is attached to a screw stem which can be turned from outside the casing to set the valve at any desired distance or pressure relation with its seat. When in operation, the initial setting is away from its seat, so that upon rise of temperature consequent response of the thermostatic bar will move the valve toward its seat to cut down the flow, and will ultimately seat it if the temperature rises high enough. In another form of the apparatus, the U-bar is connected between the valve and a wall of the casing so that its expansion tends to close the valve. The other side of the valve is pressed by a coiled spring arranged on the end of a screw adjustable from outside the casing. In this embodiment of the invention, the valve floats between the thermostatic spring on one side and the coiled spring on the other side. By providing a valve seat of large perimeter, the flow controlled by the valve may be varied through the desired range by relatively small movements of the valve disk toward and away from its seat. This permits the selection of desired setting of the valve to be effected within a single turn of the adjusting screw, thus permitting the use of a scale and pointer turning above the axis of the screw for designating the desired adjustment. By proper correlation of the moving parts, it also makes possible the production in one unit of a shut-off valve which can be operated both manually and automatically.

It is intended that the patent shall cover by suitable expression in the appended claims, whatever features of patentable novelty exist in the invention disclosed.

In the accompanying drawings:—

Figure 1 is a plan of the preferred form of the apparatus;

Figure 2 is a medial section on line 2—2 of Figure 1;

Figure 3 is a section on line 3—3 of Figure 1, but with the arm latched;

Figure 4 is a medial section of a modification of the apparatus; and

Figure 5 is a bottom plan of the valve of Figure 3.

Referring to the drawings the valve comprises a cylindrical casing 10 having a valve chamber 12 into which gas is led through a supply pipe 14, and from which the gas passes through a relatively large opening 16 in the bottom of the chamber to pipe 17 leading to the burner. Around the edge of opening 16 is a raised rim forming a valve seat 18 on which the valve disk 20 may rest to cut off the flow of gas through opening 16.

In the preferred form of the device this valve is a plane disk having a boss on its upper side to receive a screw 22 which loosely engages one arm of a U-shaped thermostatic spring bar 24. The other arm of this U-bar is secured to a stem 26 which enters the chamber 12 through its top, in which it is threaded. For purposes of manufacture and assembly the top is a plug closure 28. To prevent leakage past this stem a suitable packing 30 and nut 32 may be provided. Suitable means, as a pointer-shaped finger or arm 34 is mounted on the outer end of the stem 26 so that the latter can be turned to set the valve inward or outward at a desired position with respect to its seat. Because of the large circumference of the seat the displacement of the disk away from it need be relatively small to effect the desired valve opening. This makes it possible to connect the thermostatic element directly to the valve, because the range of travel of the U-bar is ample to effect the desired travel of the valve. Furthermore, it permits a suitable pitch to be chosen of threads on stem 26 which will enable the valve to be moved between full-on and full-off positions during less than a single rotation of the stem. If the pitch chosen is wide enough it may be preferable to use a double thread in place of the single thread illustrated. This makes it possible for the full range of travel of the valve to be indicated on a single scale of less than a circumference. To this end a raised cap 36 may be provided on the top of the casing, upon which is inscribed a scale or indications, showing by the word Off that when the pointer 34 is swung to one limit, against a raised stop 36ª the valve is closed, and when swung around to the other side of the stop, pointing to the word On, the valve is fully opened. In the particular embodiment illustrated suitable arms or lugs 38 are cast on the casing 10 by which the valve is attached to a suitable support.

In operation, as for example in connection with a gas burner, to control its supply of fuel, for starting the burner the arm 34 is to be swung to the full-on position and the gas ignited. As the temperature of the thermostatic U-bar 24 rises its arms spread. Since one arm of the U is fast to the stem 26, the full spreading is accomplished by movement of the other arm, and the valve which it carries toward the seat. A desired temperature of the thing which is being heated having been attained, the arm 34 may be swung toward the closed position until the valve is seated. This will occur before the lever reaches the off position because the thermostat will have already acted to move the valve part way toward its seat. With the valve thus closed the main flame will be cut down to very small proportions, for which gas is supplied through the by-passage 46. Upon the temperature of the U-bar becoming less its arms will contract, and the valve will be thus lifted, allowing gas to flow through the ring opening above its seat and establish a large flame again. However, it is possible by setting the arm with the valve open a little to provide so that the thermostat and valve remains substantially unchanged while the flame burns steadily, supplying heat to its utility, at a steady rate, as distinguished from intermittent action; and in this case if temperature of the thermostat increases or decreases the size of the flame will be reduced or enlarged automatically, so that there is still a continuous flame, which varies in size according to need, as determined by the setting of the arm 34. When the flame is to be shut off permanently, the resiliency of the U-bar permits the valve to be set against its seat, and to be pressed thereagainst with such resiliency of the U-bar that when the latter has fallen to a lower temperature it still does not open the valve but continues to press it tightly shut. In this case of permanent closure the arm 34 would be lifted slightly by its hand knob 40 and swung along the stop plate 36ª until the end of the stem 40ª of the knob dropped into a recess 36ᵇ in the plate. This engagement would lock the valve against accidental opening and the greater contraction of the U-bar arms thus effected would keep the valve closed after the thermostat had cooled down. Any dimensional changes of the thermostat which occur while its two arms are thus held so that neither can move, under the pressures which exist at the moment, are accommodated by a yielding of the bar at the curve or yoke of its U, making a slightly greater bow. Similarly, if desired, the valve can be latched open by swinging the arm 34 counterclockwise until the stem 40ª entered the recess 36ᵇ. If desired, the cap 36 may be provided with a raised portion 36ᶜ having spaced depressions 36ᵈ therein for latching the arm at selected settings in its swing.

In the embodiment shown in Figures 4 and 5 the casing 10' has in its upper portion an inlet chamber 12', valve 20', and thermostatic U-bar 24', all similar to the corresponding parts described in connection with Figures 1 and 2. In this case, however, one arm of the U-bar is secured rotatably to the fixed top of the chamber, which in the instance illustrated is a closure plug 28'. A stud 29 is threaded into the plug, and has a shoulder 29', slightly deeper than the thickness of the U-bar, which forms the bearing upon which the bar can turn relative to the stud so that in assembling, as the plug is screwed in and the bow of the bar brings up against the lug 10" on the wall of the casing, the plug can continue to rotate without swinging the bar. The other end of the U-bar simply rests on the boss 20" on valve 20', and tends constantly to urge the valve toward its seat. The adjustment of the valve disk 20' with respect to its seat is effected by a stem 26' which is threaded through the bottom of the casing 10' and extends into an outlet chamber 48. A spiral spring 50 is housed in this outlet chamber, and forms a yieldable connection between a disk 26″ on the stem 26′ and the valve disk 20′.

In assembling this type of valve the U-bar is given an initial set so that at a suitable low temperature its strength will hold the valve on its seat in opposition to the force exerted by the coiled spring when the disk 26″ is near the bottom of the outlet chamber. When the burner is started a star wheel 34′ secured to stem 26′ is turned until an arm 52, also attached to the stem, strikes a lug 10‴ on the casing. The consequent rotation of the stem moves it axially to further compress the spring 50. The force thus stored in the spring lifts the valve from its seat, thereby causing the U-bar to yield and bring its arms closer together. The rise in temperature, following the igniting of the gas, causes the bar arms to diverge and thus to move the valve toward its seat. By suitably setting the star wheel 34′ any desired relation between the spring forces may be attained and the valve's movements controlled to effect closure at a desired temperature. And by retracting the spring 50 until it offers no appreciable effect on the valve, the force of the U-bar can be depended upon to keep the valve closed indefinitely. When the valve is seated, gas can flow into the outlet chamber 48 through by-pass 46 in sufficient quantity to maintain a flame of pilot size if desired. The positioning of the valve between two opposed spring forces results in a smooth travel of the valve toward and from its seat, and insures that the valve will not stick to its seat if left closed for a long period of time.

In both illustrations all the moving parts are arranged in alignment with the forces acting substantially along the axis of the casing. This aids in the casting and the machine operations of manufacture and in the assembling of the valve.

I claim as my invention:—

1. A thermostatic control valve comprising a casing having an inlet chamber; an outlet chamber; a valve seat between them; a valve in the inlet chamber; a coiled spring in said outlet chamber adapted to extend through said seat and yieldingly to support said valve away from said seat; and a thermostatic spring in said inlet chamber acting on said valve in opposition to said coiled spring and adapted upon rise of temperature to tend more strongly to force said valve toward its seat.

2. Control apparatus for a gas burner comprising a casing having an outlet chamber connected to the burner; an inlet chamber connected with a supply of gas; a valve seat between said chambers; a valve in said inlet chamber seating in the direction of flow of gas and supported away from its seat by two springs; one of said springs being coiled within said outlet chamber and arranged to extend through the valve seat into said inlet chamber against one side of said valve; and the other spring being a U-shaped thermostatic bar with one end fastened to the casing and its operating end pressing on the opposite side of said valve in opposition to said coiled spring and adapted upon rise of temperature to overcome the force of said coiled spring and to move the valve toward its seat, thereby to regulate the flow of gas to the burner.

3. Control apparatus for a gas burner comprising a casing of approximately cylindrical configuration adapted to be supported with its axis vertical; an inlet chamber at the top connected with a supply of gas; an outlet chamber at the bottom connected to the burner; a valve seat between said chambers; a disk valve in said inlet chamber adapted to be seated by gravity in the direction of flow of the gas; a spring coiled within the outlet chamber with its upper end engaging the under side of said disk valve, and being adapted to extend into the inlet chamber and support the valve away from its seat; a threaded stem engaging the lower end of said coiled spring and extending axially through the bottom of the valve casing; a hand lever mounted exteriorly on said stem for changing its position axially of the casing, to vary the valve displacing effect of the coiled spring; a U-shaped thermostatic bar having its operating end pressing on the upper side of the disk valve; and a removable cover in the upper end of said casing to which the other end of said U-bar is attached; said U-bar being adapted upon rise of temperature to overcome the displacing effect of the coiled spring and to move the valve toward its seat, thereby to regulate the flow of gas to the burner.

Signed at Boston, Massachusetts, this 19th day of January 1926.

GEORGE S. BARROWS.